United States Patent [19]

Everts

[11] 4,369,742
[45] Jan. 25, 1983

[54] CONNECTING ROD FOR INTERNAL COMBUSTION ENGINE

[75] Inventor: Robert G. Everts, Mesa, Ariz.

[73] Assignee: Piston Powered Products a division of RW Technologies, Inc., Tempe, Ariz.

[21] Appl. No.: 761,762

[22] Filed: Jan. 24, 1977

[51] Int. Cl.³ .................. F02B 75/32; G05G 1/00
[52] U.S. Cl. .................. 123/193 P; 123/197 AB; 74/579 E
[58] Field of Search ........ 123/193 P, 197 A, 197 AB, 123/197 AC; 74/579 E

[56] References Cited

U.S. PATENT DOCUMENTS

| | | | |
|---|---|---|---|
| 1,254,345 | 1/1918 | Nowosielski | 74/579 E |
| 1,264,144 | 4/1918 | Berg | 74/579 E |
| 1,386,144 | 8/1921 | Wall | 123/193 P |

Primary Examiner—Craig R. Feinberg
Attorney, Agent, or Firm—Donald D. Mon

[57] ABSTRACT

A connecting rod for an internal combustion engine. The crankshaft comprises two substantially identical parts each of which has a face to be brought into abutment with a corresponding face of the other part, and a pair of tubular journal sleeves. These tubular journal sleeves are brought toward each other over a pair of bearing inserts which thereafter hold the parts assembled to one another and are themselves held in alignment.

7 Claims, 7 Drawing Figures

U.S. Patent  Jan. 25, 1983  4,369,742
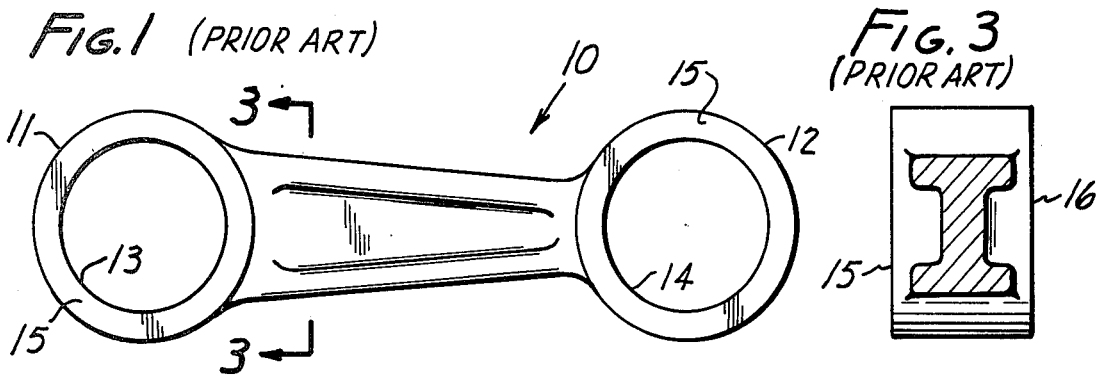
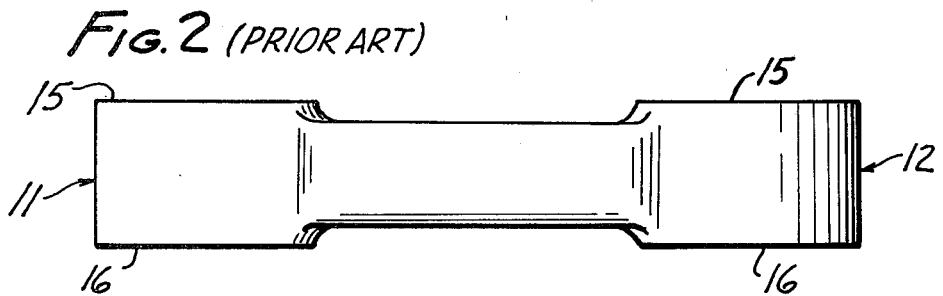
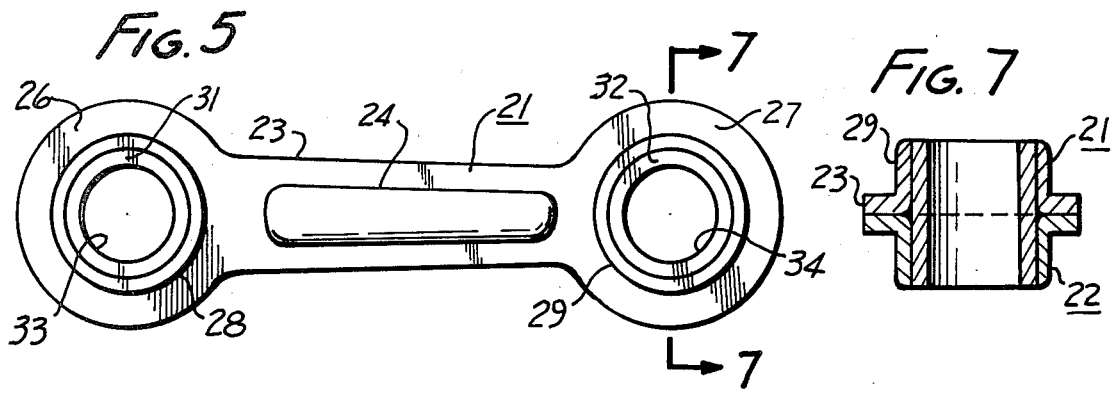
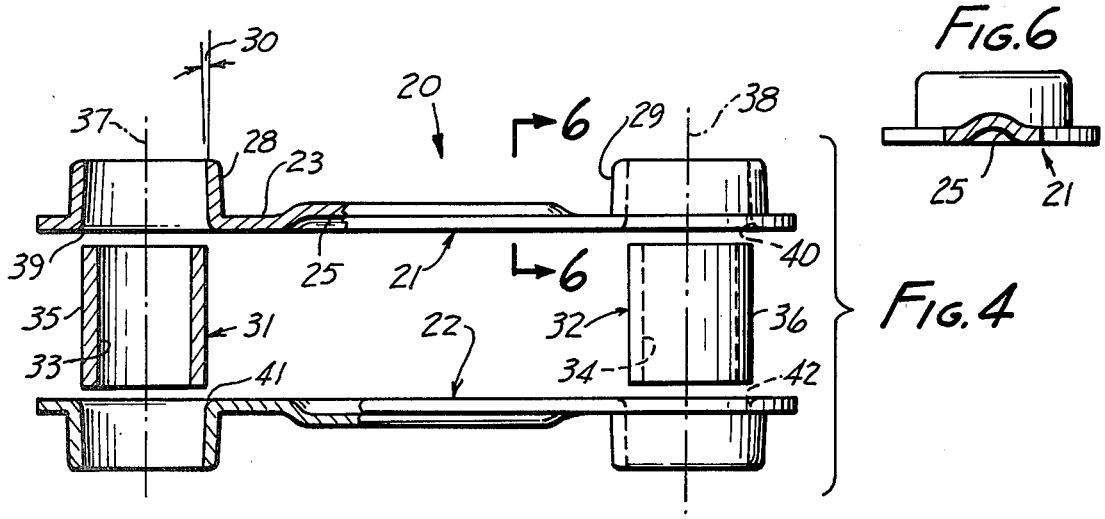

CONNECTING ROD FOR INTERNAL COMBUSTION ENGINE

This invention relates to connecting rods for internal combustion engines, especially for fractional horsepower two-cycle engines.

The manufacture of a conventional connecting rod is a comparatively expensive procedure. Generally it starts with a casting or forging and requires careful and expensive machining. It is an object of this invention to provide a connecting rod construction which can be formed from two relatively inexpensive stampings and two bearing inserts. The assembly is comparatively inexpensive, and is reliable and acurate.

A connecting rod according to this invention includes a pair of substantially identical parts each of which has an abutment face. The abutment faces are brought against one another, and a pair of journal sleeves extends away from the other side of each. These journal sleeves are pressed over a pair of bearing inserts which thereafter hold the assembly together.

According to a preferred but optional feature of the invention the journal sleeves are internally tapered to provide a retentive force to the bearing inserts.

The above and other features of this invention will be fully understood from the following detailed description and the accompanying drawings in which:

FIG. 1 is a plan view of a prior art connecting rod;
FIG. 2 is a side view of FIG. 1;
FIG. 3 is a cross-section taken at line 3—3 of FIG. 1;
FIG. 4 is an exploded view partly in axial cutaway cross-section and partly in side elevation of the presently preferred embodiment of the invention;
FIG. 5 is a top view of FIG. 4;
FIG. 6 is a cross-section taken at line 6—6 in FIG. 4; and
FIG. 7 is a cross-section taken at line 7—7 in FIG. 5.

FIG. 1 shows a connecting rod 10 according to the prior art. Such a rod customarily includes a pair of journal ends 11, 12 which have respective bearing surfaces 13, 14. If preferred, said surfaces can act as means to hold a friction bearing insert therein with bearing surfaces, or even a roller or ball bearing. Whichever arrangement, the faces 15, 16 of the rod must be accurately finished, the centers of the journal ends must accurately be located, and the axes parallel. Because the material is a forging, the machining operations, even though conventional are still expensive and time consuming. It is an object of this invention to provide a connecting rod with the advantages of the prior art, but which can be made inexpensively from stampings and inserts.

In FIG. 4 there is shown an exploded view of a connecting rod 20 according to the invention. The rod comprises a pair of rod parts 21, 22 which are identical to one another. Therefore only part 21 will be described in detail. It includes a central web 23 which has a stiffener rib 24 stamped therein. This rib has a central arched portion 25 (FIG. 6).

At each end of the part there is a journal pad 26, 27 and extending from each pad a journal sleeve 28, 29 respectively. These journal sleeves may readily be formed in the stamping operation simply by piercing and extruding the material of the flat piece of metal from which the part is made. Preferably each of the journal sleeves has a slight taper shown by angle 30. This is a very gradual taper, but when used can serve a valuable purpose as described below. The taper angle will ordinarily be less than one degree conical included angle. If preferred, there need be no taper.

A pair of bearing inserts 31, 32 is provided. Each has an inside bearing surface 33, 34 and an outside wall 35, 36 all respectively. Bearing surfaces 33 and 34 could be the inside surfaces of an inner bearing race, instead of the bearing surface of a frictional bearing. These are fully equivalent for purposes of this invention.

The bearing surfaces 33 and 34 have respective central axes 37, 38. If desired, short lead-in chamfers 39, 40, 41, 42 may be formed on the ends of the outside walls to assist in inserting the bearing insets into the journal sleeves. The outside diameter of walls 35 and 36 is intended to make an interference fit with the inside of the respective journal sleeve. The outside walls 35 and 36 are preferably cylindrical. When the tapered construction is used, the outer diameter will be about the same as the nearest end of the respective journal sleeve, and somewhat oversized relative to the free end of the respective journal sleeve. When a taper is not provided, the outer diameter will be a trifle oversized. The oversize will usually be on the order of about 0.002 inches on the diameter.

The use of a taper facilitates manufacturing the part by the stamping operation because it is easier to get the part off the tool. Furthermore, the taper resists the tendency of the bearing inserts to pull out, because it exerts an inwardly and axially directed retentive force against the wall of the bearing insert opposing any tendency of the parts to separate.

The connecting rod is assembled simply by first aligning the bearing inserts on an assembly jig. One part is pressed over one end of both of the inserts, and the part is turned over in the jig. Then the other part is pressed on. The faces bear against one another, and the bearings are tightly held in precise adjustment.

The connecting rod is now very accurately manufactured. The parts are held together without cementing or fastening means. The rod is ready for use. It will be seen that this construction comprises merely two sleeves and two stamped parts, and is inherently much less expensive than a standard connecting rod made from a machine forging.

Furthermore, materials resistant to heat and the conditions in an internal combustion engine can be used which can be relatively lighter than conventional forging material. For example, these connecting rods can readily be made from 1010 mild carbon steel perhaps case-hardened and will therefore be lighter and certainly as strong as conventional connecting rods.

This invention is not to be limited by the embodiment shown in the drawing and described in the description which is given by way of example and not of limitation, but only in accordance with the scope of the appended claims.

I claim:

1. A connecting rod for an internal combustion engine comprising: a first and a second rod part, each of said rod parts having a central web, a pair of spaced-apart journal pads, a journal sleeve opening from each said pad, and a pair of bearing inserts including a central bearing passage having an axis and an outside wall, said outside wall being so proportioned as to make an interference fit in a respective journal sleeve of both of the rod parts, whereby the two parts are brought against each other into contiguity while embracing and holding the two bearing inserts with their axes parallel to form an assembled connecting rod, said rod parts being joined together only through the bearing inserts, and being held to said inserts only by the interference fit they make with the inserts in final assembly.

2. A connecting rod according to claim 1 in which the outer walls of the inserts are substantially cylindrical and in which the journal sleeves before the inserts are inserted are internally tapered, becoming smaller in diameter as they extend away from the rod part of which they are not a part, whereby the interference fit is greater farther from the other rod part than closer to it.

3. A connecting rod according to claim 1 in which said rod parts are metal stampings.

4. A connecting rod according to claim 1 in which each of the connecting rod parts has a face, the faces being contiguous one another.

5. A connecting rod according to claim 4 in which the outer walls of the inserts are substantially cylindrical and in which the journal sleeves before the inserts are inserted are internally tapered, becoming smaller in diameter as they extend away from the rod part of which they are not a part, whereby the interference fit is greater farther from the other rod part than closer to it.

6. A connecting rod according to claim 1 in which the web includes a stiffener portion.

7. A connecting rod according to claim 6 in which said stiffener comprises an arched portion extending toward the two journal pads.

* * * * *